2,698,275
Patented Dec. 28, 1954

2,698,275
BIOCHEMICAL CONTROL OF CEREAL GRAIN GERMINATION

Benjamin B. Stoller, Milwaukee, Wis., assignor to Pabst Brewing Company, Milwaukee, Wis., a corporation of Delaware No Drawing. Application January 4, 1951, Serial No. 204,497

8 Claims. (Cl. 195—71)

This invention relates to the biochemical control of the germination of cereal grains, especially barley, in the practice of malting.

Germination of the cereal grains, especially barley, also called "malting," has been practiced many years. Improvements in the practice have been largely confined to the development of equipment and machinery for maintaining and adjusting temperatures, moisture, and aeration of the grain during steeping, growing and kilning. These improvements in methods for controlling the physical environment have resulted in a saving in labor and a reduction in time for the process, especially in the germination of barley, the time being reduced from 9 to 12 days to 5 to 7 days at present.

Several references in the literature mention the use of plant hormones in malting of barley. Lafferty (Proceedings of Int. Seed Testing Assoc. 12:19–31–1940) describes the treatment of barley with alpha naphthalene acetic acid at the rate of about 100 mg. per 100 grams of barley. His purpose in using hormones was to improve growth of barley in the field, rather than to control growth during malting. He further demonstrated that the rootlet growth of barley could be controlled by plant hormones but the concentration of hormones he employed was extremely high.

Bawden (Amer. Soc. Brew. Chem. 11:10–13–1946) attempted to use various plant hormones at lower concentrations (e. g., 10 mg. per liter) to stimulate the growth of the barley. His results showed no significant effect of treated grain over that for the control.

Recently, Dickson, Shands, and Burkhart (Cereal Chem. 26:13–23–1949), described experiments in which they claimed a 1% increase in recovery of malt from barley by steeping the grain for 36 hours in relatively high concentrations of plant hormones. The use of the high amount of hormone (100 to 200 p. p. m.) they recommend and the long steeping in hormone solution would make this method impractical. Furthermore I have found that an increase in yield of malt by means of appreciable amounts of hormone invariably resulted in a decrease of the percentage of extract.

As described in my U. S. Patent 2,522,409, issued September 12, 1950, entitled "Production of Sprouted Legumes," I have developed a method for using plant hormones to prevent growth of roots of legumes in the commercial production of bean sprouts. The method was to steep beans in low concentrations of plant hormones (4 mg. per pound of beans or 1 mg. per liter of steep water) for 8 hours, then wash and allow the beans to germinate. This simple method could not be applied to the cereal grains because the physiological reaction of legumes is different from that of the grain. In my work with grain over one hundred different hormones were tested and none responded to low concentrations of hormones similar to the effect of hormones on legumes. My result, that low concentrations of hormones had no significant effect on grains, is similar to Bawden's results, cited above. When the concentration of hormones was increased to 200 p. p. m. (or 100 to 200 mg. per 100 grams of air-dry grain) inhibition of root growth and reduction of respiratory losses could be obtained, these results being similar to those of Lafferty and Dickson et al. cited above. But in my experiments, when high concentrations of hormones were used, there was also an equally significant reduction in the per cent of extract derived from the malt made from the barley treated with hormones. Accordingly, there was no advantage gained by using plant hormones, since the reduction in root and respiratory losses were counterbalanced by a reduction in per cent extract.

I have found that when barley was steeped in solutions of plant hormones at pH's of lower than 5.5, the concentration of the effective dosage of hormones was reduced about ten times, so that 10 to 25 mg. per 100 grams of air dry grain was sufficient to inhibit root growth and reduce respiratory losses. However, the per cent extract of the treated grain was not as high as that of the control. Similarly, the concentration of hormones can be greatly reduced by spraying the hormone solution directly on the grain after "chitting" and after the roots are about 5 mm. long. But here, too, the gain in reduction in root and respiratory losses is offset by the decrease in percentage of extract. Another method tried was to spray the germinating grain with very small amounts of hormones (0.1 to 0.5 mg. per 100 grams of grain) at more frequent intervals (12 to 24 hour periods) during the germination, but here again, the percentage of extract was not quite as high as that of the control.

One of the objects of this invention is to provide a biochemical control of the germination of cereal grains, especially barley, wherein there is a decrease in the number of days the grain is germinated, a decrease in the root and respiratory loss, and an increase in the percentage of extract from the malt.

Another object of the invention is to provide an improvement in the practice of malting which results in a saving of time and materials, an increase in the yield of extract and at the same time results in a high quality malt. Other objects will appear hereinafter.

In accordance with the invention a cereal grain is partially germinated to effect chitting, the pH is then reduced, the grain is thereafter sprayed with low concentrations of plant hormones, and finally the germination is completed.

The reduction in pH may be effected, either by adding a solution of organic acids, mineral acids or acid salts to the steep water after a predetermined period of germination, or by spraying the partially germinated grain with such acids or acid salts.

The quantity of acidic substances (i. e., acids or acid salts) employed should be sufficient to react with the surface tissues or inner tissues of the grain to the extent that when a sample of the grain is germinated for 24 hours after the addition of the acidic substance and covered with distilled water the pH of this water after standing about 30 minutes in contact with the grain is lower than pH 6.0, which is the normal pH for grain not treated with acids, and preferably between pH 4.0 and pH 5.0.

If the grain is acidulated by adding an acid or an acid salt to the steep water, it is preferable to add a quantity of acid or acid salt sufficient to produce a pH of approximately 2.0 and to mix the grain with the acidulated water until the previously described acidic condition of the grain has been attained.

If the acids or acid salts are applied in the form of a spray the grain is preferably allowed to germinate until the coleorhiza is ruptured and the rootlets are about 5 mm. long. The spraying is performed after the proteins in the germ dissociate during germination. Although the invention is not limited to any theory, it is believed that during this dissociation of the proteins there is a freeing of sulfhydryl groups and other elements so that the growth of the grain, especially the rootlet of the grain, is more sensitive to chemical control.

The acids found suitable for use are organic acids, e. g., lactic acid, or mineral acids, e. g., sulfuric, hydrochloric, nitric and phosphoric acids. Acid salts, e. g., potassium dihydrogenphosphate and superphosphate, as well as mixtures of acids and salts are also suitable.

The plant hormones that may be used are chemicals with a basal ring system having a high surface activity and a carboxyl group in a very definite spatial position with respect to this ring system. Useful in the method of the present invention are certain aryl and aryloxy aliphatic acids, substituted or unsubstituted, and their salts, esters and amides. When unsubstituted aryl or aryloxy aliphatic acids or their derivatives are employed, the alpha rather than the beta aliphatic acid derivatives should be used. When halogens are substituted in the benzene ring of the phenoxy aliphatic acids, one of these halogens should always be present in the para or "4" position. Subject to the foregoing limitations, any of the compounds described in Jones, U. S. Patents 2,396,513, 2,394,916 and 2,412,510 may be used for the practice of this invention. Examples of the specific compounds useful in the practice of the invention are alpha phenoxy propionic acid, 2,4-dichlorophenoxyacetic acid and its alkyl esters (e. g., the methyl, ethyl, propyl or butyl ester), alpha naphthalene acetic acid, methyl-1-naphthalene acetate, 2,4,5-trichlorophenoxyacetic acid, and isopropyl-N-phenylcarbamate.

The quantity of plant hormone required for the purpose of the invention is not more than 100 parts by weight per million parts by weight of the air-dried cereal grain and is preferably about 1 to 50 parts per million.

The invention will be illustrated but is not limited by the following examples.

Example I

A Minnesota barley, grade A was steeped for 36 hours at 60 degrees F. After germination for 24 hours the barley was sprayed with 1% sulfuric acid (specific gravity 1.84). For the 1850 grams of barley (11.8% moisture) used, a total of 81 ml. of 1% $H_2SO_4$ was required. The grain was thoroughly mixed in a wire cage after spraying. After the grain germinated for another 24 hours, it was sprayed with 80 ml. of an aqueous solution containing 4.5 mg. of the ethyl ester of 2,4-dichlorophenoxyacetic acid and 2.0 ml. of acetone. The grain was thoroughly mixed, as before, after spraying. The grain was then allowed to germinate for a total of 84 hours and kilned as usual. The barley was germinated at 67 degrees F. for the first 24 hours, and then at 55 degrees F. for the rest of the germination period.

The results of this treatment compared to the control were as follows:

|  | Total losses: Steeping, Respiratory and rootlets (percent) | Growth Index | Percent Extract Fine | pH of Extract | Clarity of Extract | Diastatic Power |
|---|---|---|---|---|---|---|
| Treated | 7.1 | 88 | 77.4 | 5.78 | clear | 95 |
| Control | 8.6 | 75 | 76.5 | 5.87 | slightly hazy | 96 |

Example II

Barley was steeped for 34 hours at 60 degrees F. and then transferred to acidulated water which was maintained at pH 2.5 for 2 hours by repeated adjustments with 1% $H_2SO_4$. The barley was mixed or the water circulated while undergoing this acid treatment. At the end of the two hours, the acidulated water was drained off and the barley washed with ordinary tap water. After 24 hours of germination, preferably at 68 degrees F., the grain was sprayed with a solution of plant hormone as described in Example I, the quantity used being about 0.25 mg. per 100 grams of air dry grain. The grain was allowed to germinate as usual for 72 hours and then kilned.

The results of this treatment compared to those of the control were as follows:

|  | Root Losses | Growth Index | Percent Extract Fine | pH of Extract |
|---|---|---|---|---|
| Control | 3.0 | 73 | 76.0 | 6.00 |
| Treated | 2.2 | 74 | 76.3 | 5.91 |

Example III

The procedure was the same as Example II except that after germination for 24 hours, the grain was sprayed with a solution of the ethyl ester of 2,4-dichlorophenoxyacetic acid at the rate of 0.25 mg. of said ester per 100 grams of air dry grain. After germination for 24 hours longer, or a total of 48 hours, the grain was sprayed again with a similar dosage of hormone. The grain was then allowed to germinate as usual for 96 hours and was then kilned.

The results of this treatment compared to those of the control were as follows:

|  | Root Losses | Growth Index | Percent Extract Fine | pH of Extract |
|---|---|---|---|---|
| Control | 3.2 | 79 | 76.4 | 6.00 |
| Treated | 2.2 | 82 | 76.8 | 5.90 |

Example IV

Three variations of treating grain with acid and plant hormone were tried. The Minnesota Grade A (6 row) barley was steeped for 36 hours at 60° F. with good aeration. After steeping the water was drained off so that the per cent moisture was about 46%. After germinating for about 24 hours, the grain was sprayed with 1% $H_2SO_4$ at the rate described in Example I. After 16 hours longer or a total of 40 hours after germination, the grain was again sprayed with a plant hormone as described in Example I. In the other two variations the barley was steeped for 32 hours. Then for the next 4 hours the grain was steeped in water acidified with $H_2SO_4$ so that the total concentration of the acidulated water was 0.05% and the pH 1.9. After 4 hours the pH was raised to pH 2.6. Instead of adding acid at the beginning of 4 hour steep as in the previous case, $H_2SO_4$ was added periodically so that the pH of the steep water was maintained at approximately 2.5 for 4 hours. After steeping in acid for 4 hours, the acid steep water was drained off, washed several times with water and drained. After germinating for about 24 hours the grain, which had been steeped in acid solutions, was sprayed with a solution of plant hormone same as described in Example I. The grain was then allowed to germinate for a total of 96 hours and kilned as usual.

The results of the three treatments compared to those of the control are as follows:

| Treatments | Total Losses: Steeping, Respiratory and Rootlets, Percent | Growth Index | Percent Extract Fine | pH of Extract | Conversion and Clarity |
|---|---|---|---|---|---|
| Control | 8.1 | 76 | 76.6 | 5.90 | |
| Sprayed $H_2SO_4$ Sprayed Ethyl 2,4D | 7.2 | 85 | 77.3 | 5.80 | All 7-8 min. and clear. |
| Steeped 0.05% $H_2SO_4$ Sprayed Ethyl 2,4D | 6.7 | 75 | 76.5 | 5.85 | |
| Steeped at pH 2.5 Sprayed Ethyl 2,4D | 7.2 | 76 | 76.9 | 5.85 | |

Example V

In this example there is demonstrated the use of a 2-row barley (Clement Falls). As in Example IV, the grain was sprayed with acid and plant hormone and steeped in acid with pH control at approximately pH 2.5 and later sprayed with plant hormone. Another variation was tried where the grain was sprayed with $H_2SO_4$ and 2,4-dichlorophenoxyacetic acid-ethyl ester at the same time, combined in one solution, after germinating for about 30 hours, instead of spraying the acid and hormone separately at different times. The 2-row barley was steeped for 40 hours at 60° F. and germinated at 47° F. to 55° F., using intermittent ventilation. The germination continued for 5 days (besides the 40 hours for steeping) instead of the usual practice of germinating for 7 days and was then kilned as usual.

The results of the three treatments compared to those of the control were as follows:

| Treatments | Total Losses: Steeping, Respiratory and Rootlets, Percent | Growth Index | Percent Extract Fine | pH of Extract |
|---|---|---|---|---|
| Control | 6.6 | 73 | 79.5 | 5.90 |
| Sprayed 1% $H_2SO_4$ Sprayed Ethyl 2,4D | 4.8 | 76 | 79.8 | 5.85 |
| Steeped at pH 2.5 Sprayed Ethyl 2,4D | 4.8 | 73 | 79.6 | 5.90 |
| Sprayed together solution containing 1% $H_2SO_4$ and Ethyl 2,4D | 4.5 | 76 | 79.7 | 5.85 |

In the foregoing examples the ethyl ester of 2,4-dichlorophenoxyacetic acid was replaced with substantially the same proportions of: (a) alpha phenoxy propionic acid, (b) 2,4-dichlorophenoxyacetic acid, (c) the butyl ester of 2,4-dichlorophenoxyacetic acid, (d) alpha naphthalene acetic acid, (e) methyl 1-naphthalene acetate, (f) 2,4,5-trichlorophenoxyacetic acid, and (g) isopropyl-N-phenyl-carbamate, with substantially the same results.

The advantages to be gained by the practice of the present invention are a decrease in the number of days the grain is germinated, a decrease in the respiratory loss and in the rootlet loss and an increase in the percentage of extract from the malt. These advantages are considered an important improvement in the practice of malting because there is a saving in time and in materials, an increase in the yield of extract and an equally high quality malt.

Although the invention has been illustrated with specific examples showing its application to the malting of barley, it will be understood that it is similarly applicable to the malting of other cereal grains, for example, wheat, oat and rye.

The invention is hereby claimed as follows:

1. A method of controlling the germination of cereal grain which comprises partially germinating said grain until it is chitted, acidulating the partially germinated grain until a sample of the grain when germinated for an additional 24 hours, covered with distilled water and allowed to stand about 30 minutes has a pH lower than pH 6, treating the acidulated grain with a plant hormone from the group consisting of aryl- and aryloxy-aliphatic carboxylic acids, their esters, amides and salts, provided that where substituents are present in an aryl ring at least one such substituent must be in the para position and where unsubstituted aryl and aryloxy aliphatic acids are used the alpha rather than the beta form should be employed, and thereafter completing the germination.

2. A method for controlling the germination of cereal grain which comprises steeping the grain until substantially chitted, germinating for a short period of time, then acidulating the partially germinated grain until a sample of the grain when germinated for an additional 24 hours, covered with distilled water and allowed to stand about 30 minutes has a pH lower than pH 6, treating the acidulated grain with a plant hormone from the group consisting of aryl- and aryloxy-aliphatic carboxylic acids, their esters, amides and salts, provided that where substituents are present in an aryl ring at least one such substituent must be in the para position and where unsubstituted aryl and aryloxy aliphatic acids are used the alpha rather than the beta form should be employed, and thereafter completing the germination.

3. A method of controlling the germination of cereal grain which comprises partially germinating said grain until it is chitted, acidulating the partially germinated grain until a sample of the grain when germinated for an additional 24 hours, covered with distilled water and allowed to stand about 30 minutes has a pH between 4 and 5, treating the acidulated grain with a plant hormone from the group consisting of aryl- and aryloxy-aliphatic carboxylic acids, their esters, amides and salts, provided that where substituents are present in an aryl ring at least one such substituent must be in the para position and where unsubstituted aryl and aryloxy aliphatic acids are used the alpha rather than the beta form should be employed, and thereafter completing the germination.

4. A method of controlling the germination of cereal grain which comprises partially germinating said grain until it is chitted, acidulating the partially germinated grain until a sample of the grain when germinated for an additional 24 hours, covered with distilled water and allowed to stand about 30 minutes has a pH lower than pH 6, treating the acidulated grain with a phenoxy aliphatic acid ester containing a chloro substituent in a position para to the oxyaliphatic acid ester group, and thereafter completing the germination.

5. A method of controlling the germination of cereal grain which comprises partially germinating said grain until it is chitted, acidulating the partially germinated grain until a sample of the grain when germinated for an additional 24 hours, covered with distilled water and allowed to stand about 30 minutes has a pH lower than pH 6, treating the acidulated grain with the ethyl ester of 2,4-dichlorophenoxyacetic acid and thereafter completing the germination.

6. A method of controlling the germination of cereal grain in malting which comprises steeping a cereal grain in water, draining off the steep water, allowing the grain to germinate until the coleorhiza is ruptured and the rootlets are grown about 5 mm. long, and then spraying it with a mineral acid solution, the quantity of acid employed being sufficient to react with the tissues of the grain until a sample of the grain after germinating for an additional 24 hours and then standing about 30 minutes in contact with distilled water will give said water a pH of about 4.0 to 5.0, continuing the germination of the acidulated grain, then spraying the grain with a plant hormone from the group consisting of aryl- and aryloxy-aliphatic carboxylic acids, their esters, amides and salts, provided that where substituents are present in an aryl ring at least one such substituent must be in the para position and where unsubstituted aryl and aryloxy aliphatic acids are used the alpha rather than the beta form should be employed, the quantity of said plant hormone not exceeding 100 parts by weight per million parts by weight of the air dry cereal grain, and thereafter completing the germination.

7. A method of controlling the germination of cereal grain in malting which comprises steeping a cereal grain in water, draining off the steep water, allowing the grain to germinate until the coleorhiza is ruptured and the rootlets are grown about 5 mm. long, separating the cereal grain from the steeping bath and spraying it with a mineral acid solution, the quantity of acid employed being sufficient to react with the tissues of the grain until a sample of the grain after germinating for an additional 24 hours and then standing about 30 minutes in contact with distilled water will give said water a pH of about 4.0 to 5.0, continuing the germination of the acidulated grain, then spraying the grain with a plant hormone from the group consisting of aryl- and aryloxy-aliphatic carboxylic acids, their esters, amides and salts, provided that where substituents are present in an aryl ring at least one such substituent must be in the para position and where unsubstituted aryl and aryloxy aliphatic acids are used the alpha rather than the beta form should be employed, the quantity of said plant hormone being within the range of about 1 to 50 parts per million parts by weight of the air dry cereal grain, and thereafter completing the germination.

8. A method of controlling the germination of cereal grain in malting which comprises steeping a cereal grain in water, draining off the steep water, allowing the grain to germinate until the coleorhiza is ruptured and the rootlets are grown about 5 mm. long, separating the cereal grain from the steeping bath and spraying it with a mineral acid solution, the quantity of acid employed being sufficient to react with the tissues of the grain until a sample of the grain after germinating for an additional 24 hours and then standing about 30 minutes in contact with distilled water will give said water a pH of about 4.0 to 5.0, continuing the germination of the acidulated grain, then spraying the grain with a solution of the ethyl ester of 2,4-dichlorophenoxyacetic acid, and thereafter completing the germination, the quantity of said ester being within the range of from 1 to 50 parts by weight per million parts by weight of the air dry cereal grain.

(References on following page)

References Cited in the file of this patent

UNITED STATES PATENTS

| Number | Name | Date |
|---|---|---|
| 2,087,059 | Kottlors | July 13, 1937 |
| 2,129,600 | Zimmerman | Sept. 6, 1938 |
| 2,168,550 | Zimmerman | Aug. 8, 1939 |
| 2,184,167 | Scholler | Dec. 19, 1939 |
| 2,396,513 | Jones | Mar. 12, 1946 |
| 2,412,510 | Jones | Dec. 10, 1946 |
| 2,427,323 | Dixon | Sept. 9, 1947 |
| 2,522,409 | Stoller | Sept. 12, 1950 |

OTHER REFERENCES

Thaussig: Preparation of Malt and Fabrication of Beer, 1882, Baird, Phila., pages 293–295.

Malcher et al.: 1949 Chemical Abstracts, 1839, citing Vestnik. Ceske Akad. Zmedelske 19, 162–8 (1943).